United States Patent [19]

Morris et al.

[11] Patent Number: 4,824,931

[45] Date of Patent: Apr. 25, 1989

[54] POLYESTERS FROM TRANS-4,4'-STILBENEDICARBOXYLIC ACID AND 1,6-HEXANEDIOL

[75] Inventors: John C. Morris; Winston J. Jackson, Jr., both of Kingsport, Tenn.

[73] Assignee: Eastman Kodak Company, Rochester, N.Y.

[21] Appl. No.: 155,788

[22] Filed: Feb. 16, 1988

[51] Int. Cl.[4] .............................................. C08G 63/18
[52] U.S. Cl. .................... 528/298; 528/299; 528/302; 528/303; 528/304; 528/305; 528/306; 428/364
[58] Field of Search ............... 528/298, 299, 302, 303, 528/304, 305, 306; 428/364

[56] References Cited

U.S. PATENT DOCUMENTS

| | | | |
|---|---|---|---|
| 2,657,194 | 10/1953 | Butler et al. | 260/75 |
| 2,657,195 | 10/1953 | Toland, Jr. | 260/75 |
| 3,190,174 | 6/1965 | Field | 88/26 |
| 3,247,043 | 4/1966 | Cardina | 156/314 |
| 3,496,839 | 2/1970 | Hartle | 204/159.19 |
| 3,842,040 | 10/1974 | Browne et al. | 260/75 M |
| 3,842,041 | 10/1974 | Browne et al. | 260/75 M |
| 4,073,777 | 2/1978 | O'Neill et al. | 260/75 S |
| 4,420,607 | 12/1983 | Morris et al. | 528/298 |
| 4,459,402 | 7/1984 | Morris et al. | 528/298 |
| 4,468,510 | 8/1984 | Morris et al. | 528/298 |
| 4,526,822 | 7/1985 | Morris et al. | 428/35 |

FOREIGN PATENT DOCUMENTS 72348  7/1974  Japan .

OTHER PUBLICATIONS

Meurisse, et al., British Polymer Journal, vol. 13, 1981, p. 57 (Table 1).
Jackson and Morris, Journal of Applied Polymer Science, Applied Polymer Symposia, 41, 307–326 (1985).

Primary Examiner—John Kight
Assistant Examiner—S. A. Acquah
Attorney, Agent, or Firm—John F. Stevens; William P. Heath, Jr.

[57] ABSTRACT

Disclosed are polyesters containing repeating units from trans-4,4'-stilbenedicarboxylic acid and 1,6-hexanediol, the polyesters having an I.V. of at least 1.20, a tensile strength of at least 20,000 psi in 1/16-in. thick injection-molded bars, and a melt viscosity of 3000 poise or less at 265° C. and a shear rate of about 107 $sec^{-1}$.

7 Claims, No Drawings

POLYESTERS FROM TRANS-4,4'-STILBENEDICARBOXYLIC ACID AND 1,6-HEXANEDIOL

TECHNICAL FIELD

This invention relates to polyesters of trans-4,4'-stilbenedicarboxylic acid and 1,6-hexanediol, which are especially useful as films, fibers, and molding plastics.

BACKGROUND OF THE INVENTION

U.S. Pat. No. 2,657,195 broadly discloses polyesters of various stilbenedicarboxylic acid isomers with glycols, aminoalcohols, and diamines. Various glycols are disclosed containing 2 to 16 carbon atoms.

U.S. Pat. No. 3,496,839 relates to low molecular weight homopolymers of 4,4'-stilbenedicarboxylic acid and aliphatic glycols useful in radiation-cured crosslinked polyester coatings. 1,6-Hexanediol is disclosed in Column 2, lines 20 to 44, in a general listing of the glycols useful in these coatings. Neither U.S. Pat. No. 2,657,195 nor U.S. Pat. No. 3,496,839 distinguishes one stilbenedicarboxylic acid isomer from another, i.e., 4,4'- from 3,3'- or cis- from trans-, etc.

Our own U.S. Pat. No. 4,420,607, U.S. Pat. No. 4,459,402, U.S. Pat. No. 4,468,510 and U.S. Pat. No. 4,526,822 all disclose polyesters based on trans-4,4'-stilbenedicarboxylic acid using various glycols which include 1,6-hexanediol.

Other patents which dislcose trans-4,4'-stilbenedicarboxylic acid are Japanese Kokai No. 72348/74, and U.S. Pat. Nos. 2,657,194, 3,190,174, 3,247,043, 3,842,040, 3,842,041, and 4,073,777. Polyesters of trans-4,4'-stilbenedicarboxylic acid and neopentyl glycol, 1,5-pentanediol, 1,6-hexanediol, and 1,10-decanediol are disclosed by Meurisse, et al., in the *British Polymer Journal*, Vol. 13, 1981, page 57 (Table 1). Jackson and Morris disclose homopolyesters from trans-4,4'-stilbenedicarboxylic acid and various aliphatic glycols in the *Journal of Applied Polymer Science, Applied Polymer Symposia*, 41, 307–326 (1985). Our copending applications entitled, "Polyesters of trans-4,4'-Stilbenedicarboxylic Acid, 1,6-Hexanediol, and 1,4-Cyclohexanedimethanol" "Polyesters of trans-4,4'-Stilbenedicarboxylic Acid, 1,4-Butanediol and 1,6-Hexanediol", and "Polyesters of trans-4,4'-Stilbenedicarboxylic Acid, Ethylene Glycol and 1,6-Hexanediol" also are of interest.

Japanese Kokai No. 72348/74 referred to on page 1 discloses that 4,4'-stilbenedicarboxylic acid polyesters having I.V.s of 0.2 to 2.0 could be used to make blends with poly(butylene terephthalate), but only I.V.s of less than 0.9 were exemplified. Therefore, there is no suggestion of the unexpected properties of the present invention.

Insofar as we are aware, the art does not disclose unexpected properties of polyesters of trans-4,4-stilbenedicarboxylic acid and 1,6-hexanediol having inherent viscosities (I.V.) above 0.9. We have surprisingly found that such polyesters having I.V.s of at least 1.20 have exceptionally low melt viscosities at these high molecular weights and unexpectedly high tensile strengths when injection molded. The low melt viscosities at high I.V. (hence, high molecular weight) are very desirable from a processability standpoint.

DISCLOSURE OF THE INVENTION

According to the present invention, the polyester comprises repeating units from at least 80 mol % trans-4,4'-stilbenedicarboxylic acid and repeating units from at least 80 mol % 1,6-hexanediol, the total mol % of acid components and glycol components each being 100 mol %, and the polyester having an inherent viscosity of 1.20 or more.

The polyesters of this invention are prepared from trans-4,4'-stilbenedicarboxylic acid and/or its esters, and 1,6-hexanediol. Examples of such useful esters are the dimethyl, diethyl, dibutyl, and diphenyl esters, etc., or any combination of these esters. The polyesters may also be prepared from glycol esters or half-ester/half-acid derivatives of trans-4,4'-stilbenedicarboxylic acid.

The acid portion of the polyesters may contain minor amounts of other aromatic dicarboxylic acids such as terephthalic acid, isophthalic acid, 1,5-, 1,4-, 2,6-, or 2,7-naphthalenedicarboxylic acid, 4,4'-diphenyldicarboxylic acid, and the like. The dicarboxylic acid portion of the polymer may also contain minor amounts of aliphatic or cycloaliphatic dicarboxylic acids such as malonic, succinic, glutaric, adipic, pimelic, suberic, azelaic, sebacic, cis- or trans-1,4-cyclohexanedicarboxylic, or dodecanedicarboxylic acid. These polyesters may contain up to about 20 mol % of these other dicarboxylic acids such that the sum of the dicarboxylic acid components is equal to 100 mol %. Essentially 100% trans-4,4'-stilbenedicarboxylic is preferred as the acid component.

The glycol portion of these polymers may contain minor amounts (not exceeding about 20 mol %) of other glycols such that the sum of the glycol components is equal to 100 mol %. Examples of useful glycols are ethylene glycol, 1,4-butanediol, 1,2-propanediol, 1,3-propanediol, 2,2-dimethyl-1,3-propanediol, trans- or cis-2,2,4,4-tetramethyl-1,3-cyclobutanediol, 1,5-pentanediol, 1,3- or 1,4-cyclohexanedimethanol, or p-xylenediol.

The polyesters may be prepared using conventional techniques well known to those skilled in the art. For example, the references cited herein contain such techniques, and are incorporated herein by reference.

The polyesters of this invention may contain antioxidants, conventional flame retardants such as phosphorus or halogen compounds, fillers such as talc or mica, or reinforcing agents such as glass fiber or carbon fiber.

The following example illustrates the preparation of the polyester consisting of 100 mol % trans-4,4'-stilbenedicarboxylic acid units and 100 mol % 1,6-hexanediol units. A mixture of 177.6 g (0.60 mol) dimethyl trans-4,4'-stilbenedicarboxylate, 92.0 (0.78 mol) 1,6-hexanediol, and 0.13 g titanium tetraisopropoxide is placed in a 1-liter flask equipped with a metal stirrer, an inlet for nitrogen, and a short distillation column. The contents of the flask are heated under nitrogen with stirring at 240° C. for 1 hr. The temperature is raised to 260° C. for 30 min and a vacuum of 0.5 mm is gradually applied over the next 5 min. Full vacuum is maintained for about 15 to 20 min and then the reaction is stopped. A high melt viscosity, white, crystalline polymer is obtained with an I.V. of 1.0. Polymer is solid-state polymerized by heating polymer ground to pass a 3-mm screen at 110° C. for 1 hr, 180° C. for ½ hr, and then at 235° C. for 4 hr to give polymer having an I.V. of 1.73. The polyesters are ground, dried at 100° C., and injection molded on a 1-oz Watson-Stillman molding machine at 260° to 300° C. The other polymers in the tables are prepared in a similar manner.

The polyesters of the present invention have inherent viscosities ≧1.20, tensile strengths of >20,000 psi in 1/16-in. thick injection-molded bars, and melt viscosities ≦3,000 poise at 265° C. and a shear rate of about 107 sec$^{-1}$ or higher. Table 1 illustrates the effect of raising the I.V. on the melt viscosity of poly(1,6-hexamethylene trans-4,4'-stilbenedicarboxylate) at 265° C. and a number of shear rates. The data shows that the usual increase in melt viscosity with increasing I.V. up to about 1.23 is observed. As the I.V. increases further to 1.36 and to 1.78, the melt viscosity decreases. In addition to this unobvious decrease in melt viscosity with increasing I.V., tensile strength also increases (Table 2). The teaching of our own disclosure of poly(1,6-hexamethylene trans-4,4'-stilbene-dicarboxylate) molding plastics properties in *J. Appl. Polym. Sci.*, 41, 307 (1985) is that as the molding temperature is raised to a temperature at which the polymer is not liquid crystalline (290° C.) we expect a decrease in tensile strength (18,000 psi down to 12,800 psi). Table 3 shows that poly(1,6-hexamethylene trans-4,4'-stilbenedicarboxylate) at 2.5 I.V. not only has higher tensile strength at 265° C. than the prior art, but higher tensile strength when molded at 300° C. than when molded at 265° C.

TABLE 1

The Effect of I.V. on the Melt Viscosity of Poly(1,6-Hexamethylene trans-4,4'-Stilbenedicarboxylate)

| Shear Rate, Sec$^{-1}$ | Melt Viscosity at 265° C., Poise @ Inherent Viscosity | | | | | |
|---|---|---|---|---|---|---|
|  | 0.68 | 1.05 | 1.23 | 1.36 | 1.78 | 2.5[a] |
| 32 | 376 | 3100 | 8680 | 7410 | 6940 | 3123 |
| 107 | 225 | 1940 | 2950 | 2730 | 2970 | 1687 |
| 320 | 178 | 667 | 1110 | 1050 | 1000 | 831 |
| 1067 | 117 | 268 | 507 | 366 | 310 | 468 |
| 3200 | 69 | 112 | 178 | 162 | 122 | 257 |
| 10668 | 39 | 54 | 73 | 79 | 56 | 139 |

[a]Some insoluble matter was filtered from the solvent prior to inherent viscosity determination.

TABLE 2

Molding Plastic Properties of Poly(1,6 Hexamethylene trans-4,4'-Stilbene-dicarboxylate) Molded at 265° C.

| I.V. Before Molding | Molded Bar I.V. | Tensile Strength, psi |
|---|---|---|
| 0.98 | 0.94 | 18000[a] |
| 1.40 | 1.21[b] | 20900 |
| 1.90 | 1.73[b] | 25200 |
| 2.50 | 1.87[b] | 33600 |

[a]See Journal of Applied Polymer Science, 41, 307 (1985).
[b]Some insoluble matter was filtered from the solvent prior to determining the inherent viscosity.

TABLE 3

Effect of Molding Temperature and I.V. on the Molding Plastic Properties of Poly(1,6-Hexamethylene trans-4,4'-Stilbenedicarboxylate)

| Molding I.V. | Molding Temperature, °C. | Tensile Strength, psi |
|---|---|---|
| 0.98 | 260 | 18000 |
|  | 290 | 12800 |
| 2.50[a] | 265 | 33600 |
|  | 285 | 37500 |
|  | 300 | 37800 |

[a]Some insoluble matter was filtered from the solvent prior to determining the inherent viscosity.

The melt viscosities of the polyesters of this invention are determined at 265° C. on an Instron Model 3211 Melt Rheometer having a barrel diameter of 0.375-in., a capillary diameter of 0.50-in., and a capillary length of 2.50 inches following the procedure of ASTM D3835. The polyesters are dried at 100° C. for 24 hr overnight in a vacuum oven prior to making the melt viscosity determination.

The inherent viscosities are determined in 25/35/40 phenol/tetrachloroethane/p-chlorophenol at 25° C. at a concentration of 0.1 g/100 mL. The tensile strength is determined on injection-molded 1/16-in. D1822 Type L tensile bars according to the procedure of ASTM D638.

While the invention has been described in detail with particular reference to preferred embodiments thereof, it will be understood that variations and modifications can be effected within the spirit and scope of the invention.

We claim:

1. Composition of matter comprising a polyester containing repeating units from at least 80 mol % trans-4,4'-stilbenedicarboxylic acid and at least 80 mol % 1,6-hexanediol, based on 100 mol % of an acid component and 100 mol % of a glycol component, the I.V. of said polyester being at least 1.20.

2. The composition according to claim 1 wherein said polyester has a tensile strength of at least 20,000 psi in 1/16-in. thick injection-molded bars.

3. The composition according to claim 1 wherein said polyester has a melt viscosity of 3000 poise or less at 265° C. and a shear rate of about 107 sec$^{-1}$.

4. Composition of matter comprising a polyester containing repeating units from at least 80 mol % trans-4,4'-stilbenedicarboxylic acid and at least 80 mol % 1,6-hexanediol, based on 100 mol % of an acid component and 100 mol % of a glycol component, the I.V. of said polyester being at least 1.20, the tensile strength being at least 20,000 psi in 1/16-in. thick injection-molded bars, and the melt viscosity being 3000 poise or less at 265° C. and a shear rate of about 107 sec$^{-1}$.

5. A fiber comprising the blend of claim 1.

6. A film comprising the blend of claim 1.

7. A molded object comprising the blend of claim 1.

* * * * *